US010472440B2

(12) United States Patent
Mohanty et al.

(10) Patent No.: US 10,472,440 B2
(45) Date of Patent: Nov. 12, 2019

(54) TOUGHENED POLYOLEFIN AND BIOCARBON BASED LIGHT-WEIGHT BIOCOMPOSITES AND METHOD OF MAKING THE SAME

(71) Applicant: University of Guelph, Guelph (CA)

(72) Inventors: Amar K. Mohanty, Guelph (CA); Manju Misra, Guelph (CA); Ehsan Behazin, Guelph (CA); Arturo Rodriguez-Uribe, Guelph (CA)

(73) Assignee: UNIVERSITY OF GUELPH, Guelph (CA)

( * ) Notice: Subject to any disclaimer, the term of this patent is extended or adjusted under 35 U.S.C. 154(b) by 64 days.

(21) Appl. No.: 15/674,015

(22) Filed: Aug. 10, 2017

(65) Prior Publication Data

US 2018/0066087 A1 Mar. 8, 2018

Related U.S. Application Data

(60) Provisional application No. 62/382,990, filed on Sep. 2, 2016.

(51) Int. Cl.
| | | |
|---|---|---|
| *C08F 210/06* | (2006.01) | |
| *C08F 210/14* | (2006.01) | |
| *C09C 1/48* | (2006.01) | |
| *C08K 5/00* | (2006.01) | |
| *C08L 23/10* | (2006.01) | |

(52) U.S. Cl.
CPC .......... *C08F 210/06* (2013.01); *C08F 210/14* (2013.01); *C08L 23/10* (2013.01); *C09C 1/48* (2013.01); *C08K 5/0025* (2013.01); *C08K 5/0083* (2013.01); *C08L 2205/03* (2013.01); *C08L 2205/08* (2013.01); *C08L 2205/16* (2013.01)

(58) Field of Classification Search
None
See application file for complete search history.

(56) References Cited

U.S. PATENT DOCUMENTS

| | | | |
|---|---|---|---|
| 4,839,405 A * | 6/1989 | Speelman | ............ C08K 5/1345 252/403 |
| 6,660,201 B1 | 12/2003 | van Manen | |
| 2006/0194914 A1* | 8/2006 | Kawai | ............ C08L 23/12 524/505 |
| 2007/0037914 A1 | 2/2007 | Heck et al. | |
| 2010/0010168 A1* | 1/2010 | Wolfschwenger | .... C07C 51/412 525/367 |

FOREIGN PATENT DOCUMENTS

| | | | | |
|---|---|---|---|---|
| EP | 2036947 | | 3/2009 | |
| EP | 2036947 A1 | | 3/2009 | |
| WO | WO-2015039237 A1 * | | 3/2015 | ............... C08L 23/12 |
| WO | WO-2016173976 A1 * | | 11/2016 | ............... C08L 23/12 |

OTHER PUBLICATIONS

Mohanty, A.K., Misra, M., Drzal, L.T. Sustainable Bio-Composites from renewable resources: Opportunities and challenges in the green materials world. J Polym Environ 2002;10:19-26.
Biagiotti, J., Puglia, D., Kenny, J.M. A Review on Natural Fibre-Based Composites—Part I, Journal of Natural Fibers, 2004; 1:2, 37-68.
Gupta, M., Wang K.K. Fiber orientation and mechanical properties of short-fiber-reinforced injection-molded composites: Simulated and experimental results. Polym Compos, 1993;14:367-382.
Das, O., et al. A novel approach in organic waste utilization through biochar addition in wood/polypropylene composites. Waste Manag, 2015;38:132-40.
Myllytie, P., Misra, M., Mohanty A.K. Carbonized Lignin as Sustainable Filler in Biobased Poly(trimethylene terephthalate) Polymer for Injection Molding Applications. ACS Sustain Chem Eng, 2016;4:102-10.
Wang, F., Du, H., Liu, H., Zhang, Y., Zhang, X., Zhang, J. The synergistic effects of β-nucleating agent and ethylene-octene copolymer on toughening isotactic polypropylene. Polym Test, 2015;45:1-11.
Puglia, D., Biagiotti, J., Kenny, J.M., A Review on Natural Fibre-Based Composites—Part II, Journal of Natural Fibers, 2004;1:3, 23-65.
Gupta, M and Wang, K.K., "Fiber Orientation and Mechanical Properties of Short-Fiber-Reinforced Injection-Molded Composites: Simulated and Experimental Results," Polymer Composites, Oct. 1993, vol. 14, No. 5, 367-382.
A. K. Mohanty, M. Misra, and L. T. Drzal, "Sustainable Bio-Composites from Renewable Resources: Opportunities and Challenges in the Green Materials World," Journal of Polymers and the Environment, vol. 10, Nos. 1/2, Apr. 2002, 19-26.
Petri Myllytie, Manjusri Misra, and Amar K. Mohanty, "Carbonized Lignin as Sustainable Filler in Biobased Poly(trimethylene terephthalate) Polymer for Injection Molding Applications," ACS Sustainable Chemistry and Engineering, 2016, 4: 102-110.
Feifei Wang, Hainan Du, Hong Liu, Yu Zhang, Xiongwei Zhang, Jie Zhang, "The synergistic effects of b-nucleating agent and ethyleneeoctene copolymer on toughening isotactic polypropylene," Polymer Testing 45, 2015, 1-11.

(Continued)

*Primary Examiner* — Christopher M Rodd
(74) *Attorney, Agent, or Firm* — Eduardo Krupnik

(57) ABSTRACT

Toughened polyolefins and methods used to produce toughened polyolefins in presence of a bio-filler. These materials can substitute traditional thermoplastic polyolefins known as TPOs or mineral filled TPOs. Exemplary compositions include a phase based on α-olefin elastomers and the use of biobased fillers. The bio-based filler used, can be a material rich in elemental carbon content. The use of additives is of regular usage for these compositions as they may be related to coupling agents, UV absorbers, light stabilizers, antioxidants, and so forth. These composition offer a remarkable lower density compared to traditional TPOs compositions altogether with bio-based value-performance addition.

22 Claims, 4 Drawing Sheets

(56) References Cited

OTHER PUBLICATIONS

D. Puglia, J. Biagiotti & J. M. Kenny, "A Review on Natural Fibre-Based Composites—Part II: Application of Natural Reinforcements in Composite Materials for Automotive Industry," Journal of Natural Fibers, 2004, 1:3, 23-65.
J. Biagiotti, D. Puglia & Jose M. Kenny, "A Review on Natural Fibre-Based Composites—Part I: Structure, Processing and Properties of Vegetable Fibres," Journal of Natural Fibers, vol. 1(2) 2004, 37-68.
Oisik Das, Ajit K. Sarmah, and Debes Bhattacharyya, "A novel approach in organic waste utilization through biochar addition in wood/polypropylene composites," Waste Management, 38, 2015, 132-140.

\* cited by examiner

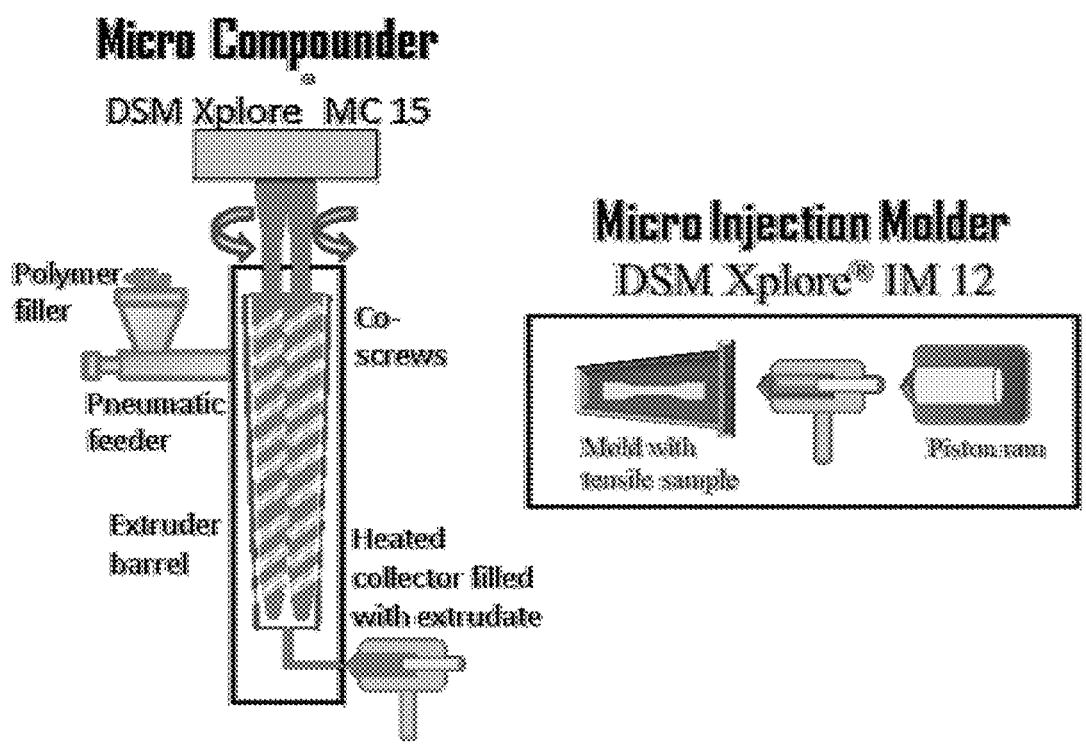
FIG. 6AFIG. 6B

TOUGHENED POLYOLEFIN AND BIOCARBON BASED LIGHT-WEIGHT BIOCOMPOSITES AND METHOD OF MAKING THE SAME

CROSS-REFERENCE TO RELATED APPLICATIONS

This application claims the benefit of provisional patent application Ser. No. 62/382,990, filed Sep. 2, 2016, the full content of which is incorporated herein by reference.

FIELD OF INVENTION

The present invention relates to toughened thermoplastic polyolefin compositions. Such materials have practical applications in the manufacture of automotive parts and related fields. In particular, such compositions include bio-based fillers and more specifically, carbon derived from plant sources, as well as additives or reinforcing agents acting in synergy with the bio-filler or the carrier resin or both to provide a desirable balance of properties and environmental durability.

BACKGROUND OF THE INVENTION

Rubbers and/or elastomers are widely used in industrial applications including tires and thermoplastic polyolefins (TPOs) used in car bumpers, etc. These materials have the ability to deform reversibly when subjected to large strains. However, this advantage fast reaches a ceiling point with respect to balance in properties such as the stiffness requirements in many automotive interior and exterior applications.

Polypropylene (PP) based TPO is one the most important categories of materials that are extensively being used in interior and exterior automotive parts. TPOs can be prepared by melt blending or by in-situ polymerization. Melt blending is a fast and cost-effective method to produce a variety of toughened compositions and it allows the inexpensive addition of fillers, additives and reinforcing materials such as fibers of any nature to the matrix resin. TPOs are of lower cost and density compared for example to polycarbonate/acrylonitrile-butadiene-styrene (PC/ABS), and therefore, more used in practice. Pure TPOs as explained herein have undesirable stiffness and henceforth are traditionally reinforced with mineral fillers, fiber or both in order to provide acceptable performance. These materials are used to improve the stiffness and other important properties such as the heat deflection temperature (HDT). Commercially available TPOs are talc filled (or other mineral fillers such as calcium carbonate) or short glass fiber reinforced or both. It is well known for those versed in the manufacturing of reinforced TPOs that inorganic fillers dramatically increase the density of the material.

An example is provided in United States patent application publication No. US20070037914A1, which discloses the use of talc to improve the flexural modulus and HDT of PP-based TPO. Another example is provided in the European patent application EP2036947A1, which describes a TPO compound reinforced with wollastonite and calcium carbonate up to 25% of total compound weight. While inclusion of these mineral fillers improves properties such as stiffness and strength, the density and toughness of the compounds is dramatically compromised. In the overall context, automakers are constantly seeking ways to reduce the weight of vehicles. In addition, it is in the interest of this industry to find sustainable bio-based materials. Therefore, such combinations of performance and sustainability must result in practical applications. Light-weight and sustainable materials in contrast to current traditional filled TPOs are a pressing need in the automotive industry and persist as a present challenge.

The urge of reducing the petroleum dependence along with the advantages offered by low cost to density ratio bio-based materials has led to the acceptance of biobased fillers in various composite applications [1]. Natural fibers and fillers have intrinsic lower density than glass fibers and mineral fillers. Henceforth, there have been a number of attempts to use natural fibers or fillers or both in PP-based compositions instead of glass fibers or mineral fillers. It is well known, however, for those versed in the art of making composites based on natural fillers or fibers that the resulting composites present intrinsic poor interphase compatibility, which induce low values of impact toughness. Other factors that limit the use of natural fibers are their hydrophilic nature as well as their low ability to withstand processing temperatures higher than 200° C. for relatively prolonged periods of time [2]. In addition, high loading of fibrous reinforcement causes property anisotropy in the final parts, which is detrimental where high geometrical precision is required [3]. Because of these limitations, most of the current polypropylene filled with natural fibers composites are produced with compression molding or needle punch techniques such as the one described in U.S. Pat. No. 6,660,201B1. There are a few works done on utilization of biochar together with wood fiber for decking and construction applications [4]. Other works on carbonized lignin and engineering plastics also have shown that inclusion of carbonized lignin can induce improvement in some of the mechanical properties of the virgin plastics, but other important properties would suffer [5]. It is important to note that in most of the scenarios the addition of carbonized material results in a noticeable reduction in impact strength of the composites.

Recently beta nucleating agents (NA) were used in order to improve impact toughness of polypropylene based TPOs [6]. While this technique improved the toughness of unfilled TPOs without hampering the other properties, addition of mineral fillers to the compound interferes with the beta NAs and would not allow them to nucleate the polypropylene efficiently. Therefore, this technique becomes inefficient with regards to filled TPOs.

The present invention discloses a route to provide balance between stiffness and toughness in toughened polyolefins. These compositions contain different loads of impact modifiers or rubbery phases as well as varying type and loads of fillers or additives or both acting in synergy with the filler or carrier resin or both while providing durability comparable to current filled compositions. More specifically, the present invention overcomes the challenges mentioned before (i.e. urge of reducing petroleum dependence, overcoming the low value of impact toughness when using natural fibers, capability of using a nucleating agent that can nucleate the PP in the presence of a filler, and so forth) by utilizing biocarbon as a filler material and fiber reinforced hybridization systems in toughened polyolefin compositions. The use of biocarbon as described herein provides valuable advantages. It is a low-cost renewable material that can be produced sustainably with a low carbon footprint. In fact, biocarbon can be produced with net negative carbon emissions. Biocarbon is thermally stable at high temperatures and can be mixed and processed with plastics without degradation to produce strong and stiff composites. In the exemplary embodiments herein disclosed, it is described how biocarbon can be used together with glass fibre or carbon fibre or both as reinforcements to achieve very high strength, stiffness and toughness without compromising the density of the composite. It is necessary to highlight that the use or weight load of the fiber reinforcement is relatively minimal compared to the total mass of the composites, resulting in high stiffness, yet keeping acceptable to very high impact strength resistance to toughness ratios. We define here "minimal" as containing less than 10 weight percent of reinforcing fiber, or more preferable less than 5 weight percent.

As disclosed herein in the exemplary embodiments the aforementioned toughened compositions present high stiffness and toughness, yet show lower density and similar durability when compared with corresponding mineral-filled TPOs currently available in the market.

SUMMARY

The toughened polypropylene-based thermoplastic polyolefin (TPO) composition of the present invention, in one embodiment, include polypropylene (PP), and an α-olefin copolymer.

In another embodiment, the thermoplastic polyolefin composition of the present invention includes a polypropylene (PP), an α-olefin copolymer, and biocarbon.

In another embodiment, the thermoplastic polyolefin composition further includes one or more compatibilizing agents.

In another embodiment, the thermoplastic polyolefin composition of the present invention further includes by weight percent: (a) 40-70% of the polypropylene, (b) 1-40% of the α-olefin copolymer, (c) 10-40% of the biocarbon, and (d) up to 10% of the one or more compatibilizing agents.

In another embodiment, the thermoplastic polyolefin composition of the present invention includes by weigh percent: (a) about 38-68% wt. of the polypropylene, (b) about 1-40% wt. of the α-olefin copolymer, (c), up to about 20% wt. of the biocarbon, and (d) up to about 10% wt. of the one or more compatibilizing agents.

In another embodiment, the thermoplastic polyolefin composition of the present invention further includes a β nucleating agent.

In another embodiment, up to 2% by weight of PP of the thermoplastic polyolefin composition of the present invention is replaced by a β nucleating.

In another embodiment, the thermoplastic polyolefin composition of the present invention further includes one or more of carbon fibers, glass fibers, peroxide, a light stabilizer and/or an anti-oxidant.

In one embodiment, the thermoplastic polyolefin composition of the present invention includes: (a) about 50-55% wt. of the polypropylene, (b) about 4% wt. of the α-olefin copolymer, (c) about 30-35% of the biocarbon, (d) about 6% of the one or more compatibilizing agents, and (e) about 0.16 to 0.5 phr of a solution containing peroxide. In one aspect of this embodiment, the thermoplastic polyolefin composition further includes up to 0.2 phr of a light stabilizer and up to 0.1 phr of an antioxidant.

In one embodiment of the polyolefin composition of the present invention, the biocarbon is milled biocarbon.

In another embodiment the polyolefin composition of the present invention is devoid of a diene copolymer.

In another embodiment of the polyolefin composition of the present invention, the PP is homo-PP.

In one embodiment, the present invention provides for a thermoplastic polyolefin composition having a melt flow index (MFI) larger than 15 g/10 minutes, the thermoplastic polyolefin composition including by weight percent: (a) 40-70% homo-polypropylene, (b) 1-40% α-olefin copolymer, (c) 10-40% biocarbon, (d) up to 10% of one or more compatibilizing agents, and (e) about 0.16-0.5 phr of a solution containing peroxide. In one aspect of this embodiment, the composition further includes up to 0.2 phr of a light stabilizer and up to 0.1 phr of an antioxidant.

In one embodiment, the present invention provides for a thermoplastic polyolefin composition having an impact greater than 500 J/m and an elongation at break higher than 200%, the thermoplastic polyolefin composition including by weight percent: (a) between 38 and 68% wt. of homo-polypropylene, (b) 1 to 40% wt. of α-olefin copolymer, (c), up to 20% wt. of biocarbon, and (d) up to 10% of one or more compatibilizing agents. In one aspect of this embodiment, the thermoplastic composition further includes up to 2% wt. of a β nucleating agent.

In another embodiment, the present invention provides for an automotive part including the thermoplastic polyolefin composition according to the present invention.

In another embodiment, the present invention provides for a method of manufacturing a composition having a melt flow index (MFI) larger than 15 g/10 minutes. The method, in one embodiment, includes mixing between 40 and 70% wt. of homo-polypropylene, 1 to 40% wt. of α-olefin copolymer, up to 10% wt. of one or more compatibilizing agents, up to 35% wt. biocarbon and about 0.16-0.5 phr of a master batch containing peroxide.

In one embodiment of the method of manufacturing a composition having a melt flow index (MFI) larger than 15 g/10 minutes, the method further includes mixing comprising up to 0.2 phr of a light stabilizer and up to 0.1 phr of an antioxidant.

In another embodiment, the present invention provides for a method of manufacturing a composition having an impact strength greater than 500 J/m and an elongation at break higher than 200%. The method, in one embodiment, includes mixing between 38 and 68% wt. of homo-polypropylene, 1 to 40% wt. of α-olefin copolymer, up to 10% wt. of one or more compatibilizing agents and up to 20% wt. of biocarbon.

In one embodiment of the method of manufacturing a composition having an impact greater than 500 J/m and an elongation at break higher than 200%, the method further includes mixing up to 2% wt. of a β nucleating agent.

In another embodiment, the present invention provides for a method of manufacturing a polyolefin composition, the method including: (a) dispersing carbon fiber within biocarbon, and (b) mixing the dispersed carbon fiber with a polypropylene (PP), an α-olefin copolymer, a compatibilizer and a beta nucleating agent. In one aspect of this method the PP is homo-PP.

DRAWINGS

Figure 4:
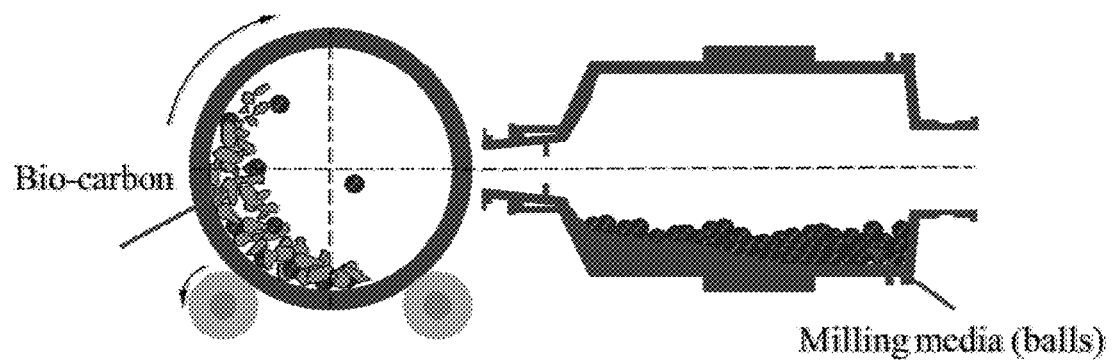

FIG. 4 Schematic representation of an industrial ball milling system.

Figure 5A:
Figure 5B:
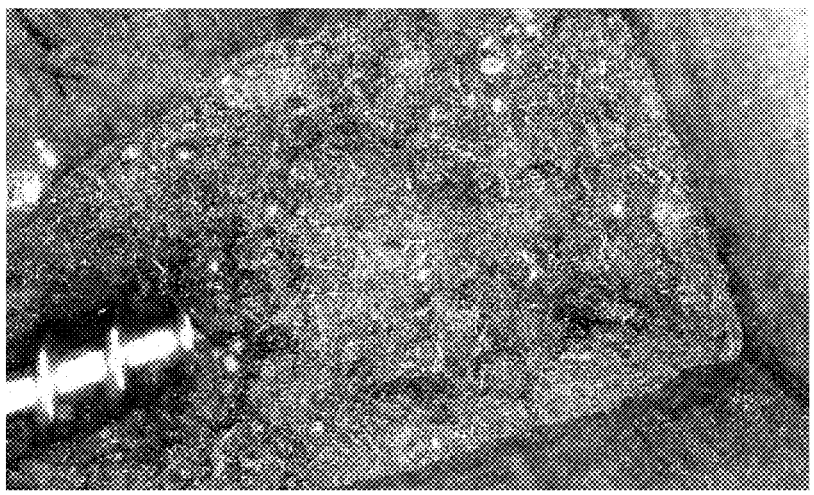

FIGS. 5A and 5B are photographs illustrating the effects of biocarbon on the dispersion of carbon fiber in the pre-mixing stage. FIG. 5A without biocarbon, FIG. 5B with biocarbon.

FIGS. 6A and 6B are schematic representation of lab scale mixing (FIG. 6A) and injection unit (FIG. 6B) used in preparation of samples.

DETAILED DESCRIPTION OF THE INVENTION

1. Definitions

Unless defined otherwise, all technical and scientific terms used herein have the same meaning as commonly understood by one of ordinary skill in the art to which this invention belongs. Also, unless indicated otherwise, except within the claims, the use of "or" includes "and" and vice versa. Non-limiting terms are not to be construed as limiting unless expressly stated or the context clearly indicates otherwise (for example "including", "having" and "comprising" typically indicate "including without limitation"). Singular forms included in the claims such as "a", "an" and "the" include the plural reference unless expressly stated otherwise. In order to aid in the understanding and preparation of the within the invention, the following illustrative, non-limiting, examples are provided. All patent and non-patent documents referred to are incorporated herein by reference.

The term "about" modifying any amount refers to the variation in that amount encountered in real world conditions of producing materials such as polymers or composite materials, e.g., in the lab, pilot plant, or production facility. For example, an amount of an ingredient employed in a mixture when modified by about includes the variation and degree of care typically employed in measuring in a plant or lab producing a material or polymer. For example, the amount of a component of a product when modified by about includes the variation between batches in a plant or lab and the variation inherent in the analytical method. Whether or not modified by about, the amounts include equivalents to those amounts. Any quantity stated herein and modified by "about" can also be employed in the present invention as the amount not modified by about.

"TPOs", as used herein, refers to materials whose elemental composition is a polyolefin thermoplastic and an elastomer which can be produced by in-situ polymerization or by blend melting technologies. This elemental composition may be modified to improve or change its properties by using fillers, reinforcing agents, coupling agents, and/or additives.

"Biocarbon", as used herein, refers to the materials derived from the pyrolysis of biomass, preferably, but not limited to plant sources, such as energy crops, agricultural and forest derived materials such as wood fiber, wood residues, lignin from both paper and lingo-cellulosic ethanol industries, post-industrial and post-consumer materials such as coffee chaff and pomace from different sources such as grape or tomato, as well as clean urban solid wastes. These materials can be produced at different pyrolysis conditions in order to provide different degrees of functionality according to the objectives of final use, that is, by controlling temperature and residence time in the reactor chamber. The word 'pyrolysis' by its nature implies that the process is carried out in a starved oxygen atmosphere.

Common "additives" for TPOs are, but not limited to, carbon black, light scavengers, UV absorbers aside of carbon black, which are added in different ratios according to the composition and properties of the materials, but which do not normally exceed 0.5 wt. % of the total composition for most additives, and preferably no more than 2 wt. % in the case of carbon black. It is the need of emphasizing that the increased use of carbon black can result in the detrimental of the properties of the compositions.

"Nucleating agents" by nature describe chemical compounds that facilitate the fast crystallization of polyolefins and more in particular beta crystal type in polypropylene resins. Examples of these materials are aluminum salt of 6-quinazirin sulfonic acid, Disodium salt o-phthalic acid and etc.

"Impact modifiers", as used herein, refers to those materials such as rubbers or elastomers that can be incorporated to the carrier resin to improve the toughness of the resin. Depending on the carrier resin different type of impact modifier might be used. In the case of polyolefins, non-polar elastomers such as polyethylene, ethylene propylene diene monomer (EPDM), of alpha olefin copolymers are common.

"Polyolefins" are those materials known in common language such as polypropylene, and polyethylene. Although this document does not limit the use of particular resins, but being so used in exemplary embodiments, the polypropylene commercially used and referred herein in this disclosure, based on cost-performance balance is that known as isotactic polypropylene.

Figure 1:
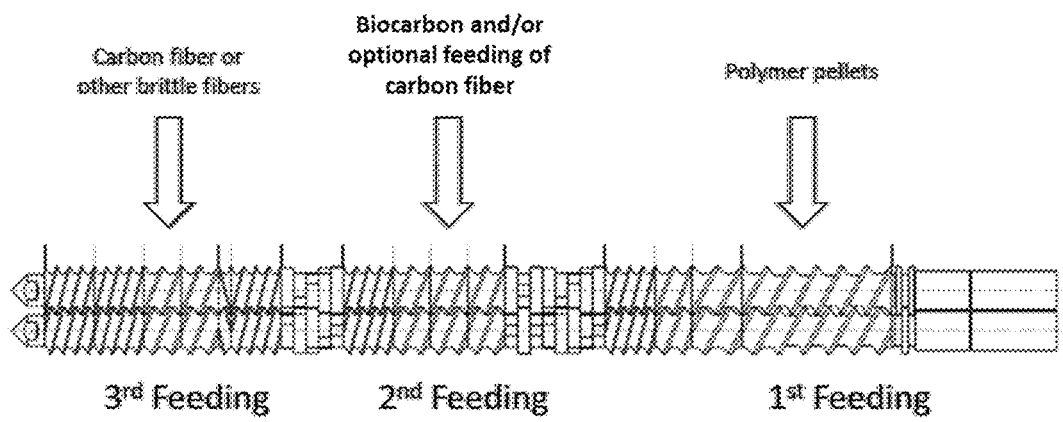
FIG. 1 illustrates an exemplary extruder screw configuration and feeding order for biocarbon based hybrid bio-composites of the present invention.

Melt blending technologies for plastics or composites, as used herein, are those having a plurality of potential alternatives to produce either different compositions by using dissimilar resins and additives, or those in which similar concentration of materials are introduced in the melt reactor in different ways to produce variation in the properties. The compositions herein disclosed were produced by means of twin screw extruders with capability of co- or counter rotation (see FIG. 1), but these do not limit the use of other devices known for those versed in the art of composite materials.

"Fillers", as used herein refer, but are not limited to mineral talc or materials commonly denominated as hydrated magnesium silicates with the general chemical formula $H_2Mg_3(SiO_3)_4$ or $Mg_3Si_4O_{10}(OH)_2$ and calcium carbonate. "Bio-fillers", as used herein, but are not limited to elemental carbon obtained from the pyrolysis of plant sources such as energy crops, industrial, urban wastes, agricultural and forest resources. "Reactive bio-fillers", as used herein, are those produced in-situ during pyrolysis having specific functionalities capable of reacting with other phases as shown by the compositions exposed in the herein embodiments. However, "reactive bio-fillers are also those carbonaceous materials obtained from the pyrolysis of the said biomasses and from which functionalities can be introduced further modifications by means of chemical or physical or both methods. In the herein exemplary embodiments, however, these materials are referred generically as biocarbon. Patent applications WO 2015/039237 A1 also as CA2924867 A1 and WO 2015/135080 up to some extent have described these materials and potentiality.

"Reinforcement materials", as used herein, are those not limited to the following mentioned such as synthetic fibers including carbon fiber, glass fiber, aramid fiber, and the alike.

"Coupling agents", as used herein, are those capable of introducing inter-molecular tangling resulting in the increment of interfacial adhesion. These materials are known in the art of composite materials as maleic anhydride grafted polymers, silanes, zirconates, and the alike.

2. Advantages

The present invention involves fundamental advantages as outlined below:

The melt flow index (WI) of the compositions are greatly improved by using a high amount of alpha olefin copolymers when compared to traditional diene based TPOs, yet without sacrificing other properties such as strength, stiffness and HDT.

The use of additives with active ingredients such as di-(2-tert-butyl peroxyisopropyl), dicumyl peroxide, etc. can be used in order to improve, recover, or adjust the flow properties of the materials.

It has been observed that dispersion of reinforcing fillers and in specific carbon fiber and recycled carbon fiber can be improved by using biocarbon. Carbon fiber disperses better in presence of biocarbon but it difficult disperses when is directly added to the polymer.

As described and not limited in the herein exemplary embodiments, the current methods involving the melt blending and/or combinations of biocarbon with the particular alpha olefin polymers or copolymers or both have not been reported or disclosed before.

As herein described for reactive bio-fillers, the optimization of pre-processing techniques to reach synergistic toughening effect by using biocarbon and alpha olefin copolymers have not been reported or disclosed before As herein disclosed in the embodiments of this disclosure, the low density of final compositions based on the hybridization of biocarbon and recycled carbon fiber or the alike are reported. The density reduction is deduced based on the comparison with current mineral filled TPOs available in the market.

This document, as herein disclosed, shows a route to produce super tough polypropylene or the similar based biocomposites containing more than 20% biobased content. High impact values of 600 J/m were achieved in toughened polypropylene and biocarbon composites with biocarbon content of 20 wt. %. This value is higher or comparable to certain traditional unfilled petroleum based TPOs. Furthermore, elongations at break greater than about 200% can be achieved with 20 wt. % or more of biocarbon loaded compositions.

Figure 2:
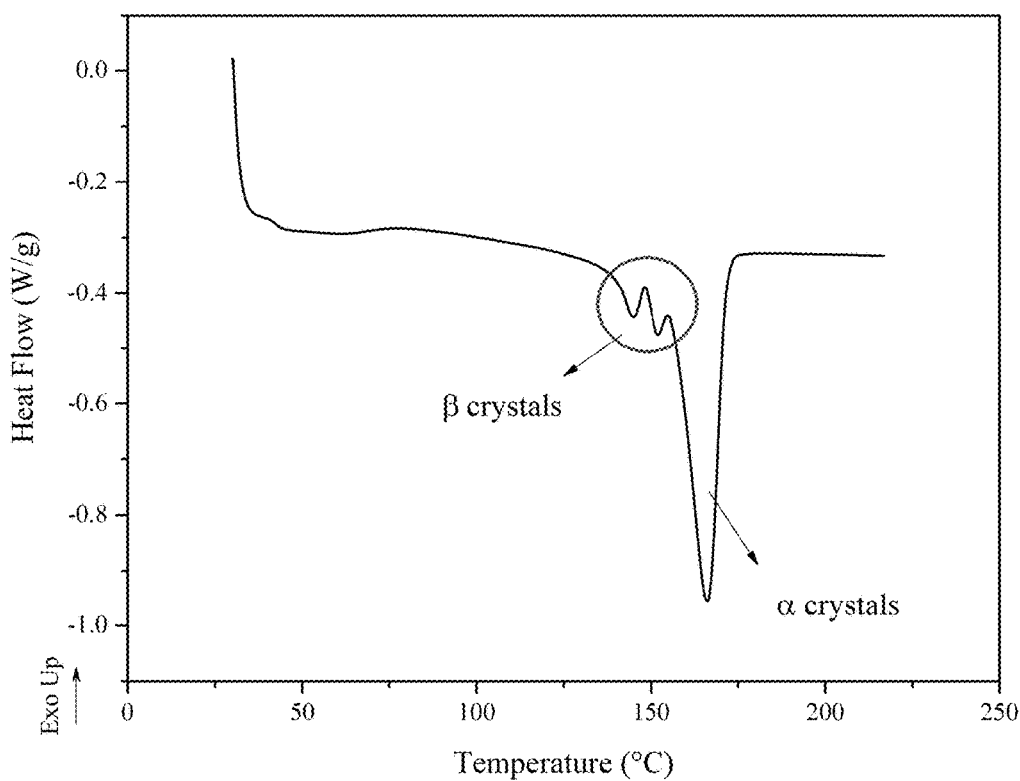
FIG. 2 illustrates the melting peaks of sample number 7 of Table 2.

As previously stated, mineral fillers interfere with the beta nucleating agents and would not allow them to nucleate the polypropylene efficiently. An unexpected result disclosed herein shows that beta-nucleating agents can work efficiently at very low loadings to induce impact modification effects in the presence of biocarbon. Unlike mineral fillers, the applicant discovered that milled biocarbon can work together with beta nucleating agents (b-NA) and produce superior impact and tensile toughness. FIG. 2 illustrates the melting peaks of beta nucleated toughened polypropylene and milled biocarbon. The two separate melting peaks shown in FIG. 2 indicate that beta nucleating agent could successfully induce beta crystallization in the presence of biocarbon and as a result high impact values were obtained. Toughness and stiffness of the biocarbon composites can then be tailored for simultaneous use of b-NA and carbon fiber.

As disclosed herein, the use of additives marketed as Tinuvin® and Irganox® and the similar additives together with biocarbon can greatly improve the durability and general properties of the biocomposites, which are exposed to high temperature environments for prolonged periods of time.

Another advantageous aspect of using biocarbon is that it reduces the cost of the final formulation, as up to 40 wt. % of the polymer matrix can be replaced with these fillers as per the property requirements of the end product.

Biocarbon is preferable over other particulate fillers such as carbon black, talc or clay due to its low cost, availability, lower density, sustainability, renewability and biobased nature.

As explained herein, biocarbon pyrolyzed at high and low temperatures reveal differences in interface adhesion resulting in either poor or enhanced tensile and flexural strengths.

The treated biocarbon can also work in synergy with certain types of nucleating agents to minimize the rubber content of the composite and enhance the stiffness and strength of the system while having Izod notched impact strength greater than 500 J/m. The optimum amount of PP beta nucleating agent can be used to reduce the elastomer amount and achieve higher stiffness of the composites without sacrificing impact toughness.

Polypropylene can be sourced from post-consumer recycled polypropylene to reduce environmental impact through repurposing waste materials.

Figure 3:
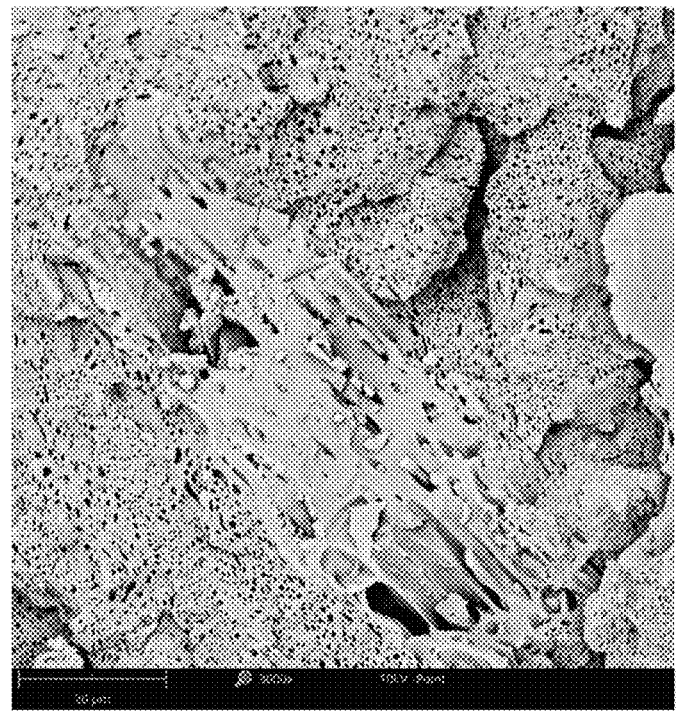
FIG. 3 is an electron microphotograph showing the fracture surface of a compatibilized biocarbon based TPO.

As disclosed in WO patent application WO2015135080A1 and shown herein in this document, biocarbon can be processed through grinding and milling operations to optimize particle size achieving, henceforth, optimum mechanical properties. Mechanical properties of the composite, such as impact strength and modulus were tailored by the pre-processing of biocarbon. A biocarbon particle and its interface with the toughened matrix is shown in FIG. 3. The strong interface between the particle and the matrix results in high impact fracture value of the composite.

The specific type of biocarbon added to the matrix acted as a nucleating agent and improved the melt crystallization of the polymer by increasing the nucleation sites.

The introduction of the reinforcing fillers or fibers in this case carbon fiber directly to the matrix or polymer pellets produces agglomerations and a poor dispersion in pre-melt mixing stage as seen in the (FIG. 5A). This issue of poor dispersion in this case of carbon fiber within the composite may be overcome to a certain extent by dispersing the carbon fiber within the biocarbon as a previous step before mixing with the matrix as it can be seen in (FIG. 5B). By nature these two materials, i.e. biocarbon and carbon fiber, show the required affinity that can be used to achieve the dispersion of the short carbon fiber within the polymer pellets.

Further advantages include:

A toughened polyolefin matrix of low cost, with enhanced MFI.

A toughened polyolefin that is free of talc.

A toughened polyolefin that can incorporate nucleating agents that do not work in the presence of talc.

A toughened polyolefin having longer life span and better durability than common diene-based TPO.

The new developments of the present invention, therefore, includes hybrid compositions targeted to cover specific requirements, but not limited to: tensile strength at yield >20 MPa; impact Izod notched energy >170 J/m; Flexural stress and modulus >40 and 1500 MPa respectively; heat deflection temperature >110° C.; Melt flow index (MFI) of >6 g/10 min at 230° C./2.16 kg; and density less than 1.040 g/cm3.

Also, higher flexural modulus (>2000 MPa) could be achieved while the impact energy remains higher than 100 J/m, as per ASTM standards.

3. Exemplary Compositions

The fabrication of composites and blends was made in a 15 cc co-rotating twin screw extruder (DSM Research, Netherlands) paired with 12 cc injection molding machine (DSM Research, Netherlands). In other instances, manufacturing was done in Leistritz co-rotating twin screw extruder where polymer blend strand was produced followed by strand pelletizing. After drying at 80 C for 12 hours polymer blend pellets were formed in test samples in 77 t Arburg Allrounder 370 injection molding machine. The constituents were mixed at an average temperature of 190° C. and 100 rpm as rotational speed of the screws. The Injection moldings were performed at barrel temperature of 220° C. under 800 bar of injection pressure. The mold temperature was fixed at 30° C. and all samples underwent a 20 s cooling cycle.

Table 2 shows the summary composition and performance of examples showing the effect of impact modifier in combination with 10 wt. % or less of reinforcing fibers and additives. Tests were performed according to ASTWhM standards. These compositions based on bio-carbon showed balanced flexural and impact properties suitable for substitution of polypropylene filled with 20 and 40 wt. % talc normally used in automotive applications.

In some of the examples, a master batch or solution containing peroxide was used for these compositions. This master batch can be commercially found at 5 wt. % concentration or higher; examples are CR5 or CRP5 from Polyvel Inc. (active ingredients di-(2-tert-butyl peroxyisopropyl)). However, other sources of peroxide can be used such as dicumyl peroxide and the alike. The effect of this additive is self-evident and properly explained in patent application WO 2015/039237 A1 in the case of complex compositions. Since the materials can lose or may present reduced ability to flow accordingly to the increased filler or reinforcing content, this additive aids in the restoration of the flow properties which is crucial for injection molding type processing. Injection molding is mainly governed by cycle time and quality of the extrudates. Fast cycling times are most of the times required for high industrial productivity. FIGS. 6A and 6B illustrate a schematic representation of lab scale mixing (FIG. 6A) and injection unit (FIG. 6B) used in preparation of samples.

Carbon and glass fiber used in these examples are chopped fiber. Chopped carbon fiber is nominally denominated "recycled" and may present lengths of 4 to 6 mm or lower or higher lengths. Glass fiber used here presents a nominal length of 3 mm, but shorter and longer fibers can be used.

Table 3 includes corresponding properties of the two formulations presented in row 13 and 14 of Table 2 in which one experiment was performed in presence of 3.5% by weight of carbon fiber and 30% by weight of biocarbon (formulation no. 13). The comparative example was manufactured by using 33.5% biocarbon by weight respect to total composition (formulation no. 14). Unexpectedly it was found that the use of 3.5% by weight of carbon fiber can boost most mechanical properties of the composites. The use of carbon fiber can vary; the percentage can increase or decrease based on or tailored to the requirements and cost-performance wise.

Examples 13 and 15 are comparable. In sample 15 the biocarbon fraction was milled or the particle size reduced. The effect was the increase of most mechanical properties of the composites. It has been shown that the small reduction in the impact modifier has a direct negative effect on the impact properties of the materials, which whatsoever can be recovered by using an appropriate combination of additives as shown in Table 3 examples 13 and 30.

Milling biocarbon can be performed either by ball milling (see FIG. 4), two roll mill, or a hammer milling systems but also by using the methods previously published in patent application WO 2015/135080 A1. At an industrial based facility it may consist of an integrated system of in situ production of biocarbon, consecutive particle reduction and preparation of the final material either blends known as master batch or the production of the composite itself. The advantage of in situ production is that the remaining temperature of the biocarbon can be used to melt the carrier resins resulting in the overall energy reduction.

Similar formulations based on glass fiber improve higher impact properties as compared to carbon fiber. Hybrids based on carbon fiber and glass fiber at low ratios can improve and balance important properties such as impact strength and moduli as well as it helps to reduce total costs of carbon fiber (self-explanatory examples 13 and 17 in Table 3). Such balance between stiffness and toughness has never been reported before in PP based biocomposites.

Compositions shown in examples 21 and 22 in Table 3 showed that after exposing the materials to 120° C. for 192 hours tensile properties either increased or maintain with a minimum loss of the rest of the properties.

Similar experiments were performed in the presence of additives such as light and UV stabilizers and antioxidants. Full test of mechanical and physical properties is shown in formulation no. 23 and respective durability results in row no. 24 of Table 3. The durability test was performed at similar conditions of temperature (120° C.) for a period of 1000 hours. The evaluation of performance showed a similar effect as described in the previous experiment above.

Compositions shown in examples 31 and 32 of Table 3 showed properties before exposure to heat aging process with and without antioxidant additives respectively. Same samples were exposed to 110° C. for 1000 hours according to ISO 188 standard, the properties after exposure are shown in row no. 33 of Table 3. The results suggest the desirable property retention after this accelerated heat aging test.

Tables:

TABLE 1

List of exemplary materials and producers

| Name | Producer |
|---|---|
| Polypropylene: PP 1120H, PP 1350N, PP 4220H | Pinnacle |
| Compatibilizer: Fusabond P353 | Dupont |
| Rubber: ENGAGE 8137, EPDM Nordel IP 3745p | Dow |
| Biocarbon: <1/64 in. and ball milled miscanthus biochar | CGTech |
| β nucleating agent: MPM 2000 | Mayzo |
| Carbon fibre: Recycled carbon fibre (TORYCA) | SOFiCAR |
| Glass fiber: HP 3273 | PPG |
| Anti-UV: Tinuvin P, Tinuvin 622 | BASF |
| Anti-oxidant: Irganox B225 | BASF |
| Peroxide master-batch: CR5, CRP5 | Polyvel |

All the grades mentioned above are exemplary material of the main category and the observed results are not limited to these examples.

TABLE 2

Compound compositions and designations

| No. | PP (%) 1350N | PP (%) 1120H | PP (%) 4220H | MA-PP (%) | IM (%) α-ole | IM (%) D | BC (%) <1/64" | BC (%) milled | Fibers (%) CF | Fibers (%) GF | bNA (%) | Other additives (phr) MBaP | Other additives (phr) UV | Other additives (phr) O2 |
|---|---|---|---|---|---|---|---|---|---|---|---|---|---|---|
| 1 | — | 70 | — | — | — | 30 | — | — | — | — | — | — | — | — |
| 2 | — | 70 | — | — | 30 | — | — | — | — | — | — | — | — | — |
| 3 | — | 52 | — | 4 | 24 | — | — | — | 20 | — | — | — | — | — |
| 4 | — | 50.4 | — | 4 | 24 | — | — | — | 20 | — | 1.6 | — | — | — |
| 5 | — | 45.5 | — | 3.25 | 16.25 | — | — | — | 20 | 5 | — | — | — | — |
| 6 | — | 45.5 | — | 3.5 | 21 | — | — | — | 20 | — | 10 | — | — | — |
| 7 | — | 57 | — | 4 | 15 | — | — | — | 20 | 2 | — | 2 | — | 0.2 |
| 8 | — | 56.1 | — | 3.8 | 15.4 | — | — | — | 20 | 0.7 | 2.5 | 1.5 | — | 0.2 |
| 9 | — | 51.1 | — | 3.5 | 14 | — | — | — | 20 | — | 10 | 1.4 | — | 0.2 |
| 10 | — | 56.2 | — | 3.8 | 15.4 | — | — | — | 20 | 1 | 2 | 1.5 | — | 0.2 |
| 11 | 53 | — | — | 3.9 | 19.5 | — | — | — | 20 | 2 | — | 1.6 | — | — |
| 12 | 51.5 | — | — | 5 | 10 | — | 30 | — | — | 3.5 | — | — | — | — |
| 13 | — | 51.5 | — | 5 | 10 | — | 30 | — | — | 3.5 | — | — | — | — |
| 14 | — | 51.5 | — | 5 | 10 | — | 33.5 | — | — | — | — | — | — | — |
| 15 | — | 51.5 | — | 5 | 10 | — | — | 30 | — | 3.5 | — | — | — | — |
| 16 | — | 53.5 | — | 5 | 8 | — | — | 28.5 | 5 | — | — | — | — | — |
| 17 | — | 51.5 | — | 5 | 10 | — | — | 30 | — | — | 3.5 | — | — | — |
| 18 | — | 51 | — | 5 | 9 | — | — | 30 | 3 | 2 | — | — | — | — |
| 19 | — | 54 | — | 4 | 8 | — | — | 30 | 2 | 2 | — | 0.16 | — | — |
| 20 | — | 54 | 6 | 3 | 4 | — | — | 30 | 1.5 | 1.5 | — | — | — | — |
| 21 | — | 51.5 | 6 | 2 | 4 | — | — | 33 | 1.5 | 2 | — | 0.5 | — | — |
| 22 | — | 51.5 | 6 | 2 | 4 | — | — | 33 | 1.5 | 2 | — | 0.5 | — | — |
| 23 | 53 | — | 6 | 3 | 4 | — | 30 | — | 2 | 2 | — | 0.16 | 0.2 | 0.1 |
| 24 | 53 | — | 6 | 3 | 4 | — | 30 | — | 2 | 2 | — | 0.16 | 0.2 | 0.1 |
| 25 | 53 | — | 6 | 3 | 4 | — | 30 | — | 2 | 2 | — | — | 0.3 | 0.1 |
| 26 | 52 | — | 11 | 3 | — | — | 30 | — | 2 | 2 | — | 0.1 | 0.3 | 0.1 |
| 27 | 52 | — | 7 | 3 | 3 | — | 24 | 6 | 2 | 3 | — | 0.1 | 0.3 | 0.1 |
| 28 | 52 | — | 7 | 3 | 3 | — | 30 | — | 2 | 3 | — | 0.1 | 0.3 | 0.4 |
| 29 | 52 | — | 7 | 3 | 3 | — | 24 | 6 | 2 | 3 | — | 0.1 | 0.4 | 0.4 |
| 30 | — | 53.5 | — | 5 | 8 | — | 30 | — | 3.5 | — | — | — | — | — |
| 31 | 53 | — | — | 3.9 | 19.5 | — | — | 20 | 2 | — | 1.6 | — | — | — |
| 32 | 53 | — | — | 3.9 | 19.5 | — | — | 20 | 2 | — | 1.6 | — | 1 | 1 |

α-ole: α-olefin,
BC: Biocarbon,
D: Diene,
IM: Impact modifier,
MBaP: Peroxide master-batch,
O2: Anti-oxidant (Irganox),
PP: polypropylene,
UV: Anti-UV (Tinuvin)

TABLE 3

TPO-biocarbon hybridized biocomposites with enhanced properties

| No. | TS (MPa) | TM (MPa) | E @ Y (%) | E @ B (%) | FS (MPa) | FM (MPa) | NIZ (J/m) | IZ (J/m) | HDT (° C.) | Density (g/cm³) | MFI (g/10 min) |
|---|---|---|---|---|---|---|---|---|---|---|---|
| EPDM vs. α-olefin copolymer |||||||||||||
| 1 | 21.1 ± 0.37 | 1290 ± 21.6 | 5.4 ± 0.12 | 231 ± 30.9 | 28.5 ± 0.27 | 967.2 ± 17.1 | 143 ± 9.6 | NM | 74.3 ± 0.61 | 0.897 ± 0.001 | 12.0 ± 0.22 |
| 2 | 24.4 ± 0.46 | 1450 ± 23.9 | 8.9 ± 0.11 | 431 ± 14.9 | 27.5 ± 0.39 | 962.6 ± 19.2 | 395 ± 22.0 | NM | 71.2 ± 0.54 | 0.896 ± 0.001 | 34.6 ± 0.53 |
| High impact properties |||||||||||||
| 3 | 22.8 ± 0.17 | 1430 ± 7.2 | 8.1 ± 0.02 | 173 ± 55.0 | 27.3 ± 0.23 | 954.3 ± 4.3 | 494 ± 16.7 | NM | 62.2 ± 1.7 | 0.972 ± 0.002 | 12.3 ± 0.25 |
| 4 | 18.9 ± 0.31 | 1165 ± 17.2 | 9.9 ± 0.03 | 215 ± 1.76 | 22.9 ± 0.15 | 857 ± 3.64 | 600 ± 21.0 | NM | NM | NM | NM |
| Balanced impact and flex properties |||||||||||||
| 5 | 36.5 ± 0.68 | 3780 ± 42.4 | 3.3 ± 0.16 | 3.89 ± 0.19 | 52.1 ± 0.87 | 2281 ± 62.5 | 115 ± 6.2 | NM | 107.8 ± 0.31 | 1.047 ± 0.001 | NM |
| 6 | 28.6 ± 0.16 | 2510 ± 2.5 | 5.4 ± 0.19 | 16.3 ± 2.53 | 39.3 ± 0.3 | 1614 ± 18.7 | 185 ± 6.6 | NM | 86.7 ± 0.45 | 1.040 ± 0.002 | NM |
| 7 | 32.9 ± 0.23 | 2436 ± 28.9 | 4.7 ± 0.05 | 10.76 ± 1.16 | 41.9 ± 0.97 | 1646 ± 54.2 | 182 ± 7.32 | NM | NM | NM | NM |
| 8 | 29.3 ± 0.35 | 2121 ± 19.44 | 5.23 ± 0.03 | 15.38 ± 1.02 | 38.4 ± 0.35 | 1514 ± 16.28 | 220 ± 11.9 | NM | NM | NM | NM |

TABLE 3-continued

TPO-biocarbon hybridized biocomposites with enhanced properties

| No. | TS (MPa) | TM (MPa) | E @ Y (%) | E @ B (%) | FS (MPa) | FM (MPa) | NIZ (J/m) | IZ (J/m) | HDT (° C.) | Density (g/cm³) | MFI (g/10 min) |
|---|---|---|---|---|---|---|---|---|---|---|---|
| 9 | 35.0 ± 0.32 | 2685 ± 14.23 | 4.97 ± 0.02 | 8.75 ± 0.61 | 46.0 ± 0.20 | 1848 ± 24.1 | 170 ± 7.3 | NM | NM | NM | NM |
| 10 | 31.2 ± 0.18 | 2234 ± 31.7 | 4.88 ± 0.01 | 13.72 ± 4.07 | 40.7 ± 0.86 | 1640 ± 48.7 | 206 ± 11.6 | NM | NM | NM | NM |
| 11 | 31.8 ± 0.21 | 2404 ± 18.5 | 4.43 ± 0.10 | 20.39 ± 3.32 | 44.8 ± 0.19 | 1835 ± 6.34 | 230 ± 7.9 | NM | NM | 1.005 ± 0.002 | 7.1 ± 0.40 |
| High moduli properties | | | | | | | | | | | |
| 12 | 33.3 ± 0.90 | 3060 ± 124 | 3.5 ± 0.01 | 3.8 ± 0.4 | 61.0 ± 1.2 | 2791 ± 84 | 33.5 ± 2 | 535 ± 35 | 127 ± 1 | 1.025 ± 0.001 | 15.0 ± 0.50 |
| 13 | 33.3 ± 0.6 | 3070 ± 200 | 3.2 ± 0.10 | 3.4 ± 0.4 | 61.0 ± 0.7 | 2702 ± 97 | 38.0 ± 3 | 547 ± 50 | 129 ± 2 | 1.025 ± 0.001 | 10.0 ± 0.50 |
| 14 | 27.8 ± 1.8 | 2140 ± 164 | 3.5 ± 0.01 | 3.9 ± 0.25 | 51.7 ± 0.6 | 2079 ± 28 | 31.3 ± 1 | 482 ± 90 | 118 ± 1 | 1.021 ± 0.001 | 10.0 ± 0.50 |
| 15 | 38.0 ± 1 | 3230 ± 200 | 3.7 ± 0.10 | 4.2 ± 0.5 | 61.0 ± 1 | 2700 ± 60 | 53.0 ± 3 | 614 ± 41 | 129 ± 3 | 1.026 ± 0.001 | 10.0 ± 0.50 |
| 16 | 41.0 ± 1.5 | 3820 ± 380 | 3.3 ± 0.10 | 3.5 ± 0.5 | 70.0 ± 2 | 3094 ± 90 | 44.0 ± 2 | 563 ± 40 | 129 ± 2 | 1.035 ± 0.001 | 11.0 ± 1.00 |
| 17 | 32.0 ± 0.5 | 2500 ± 241 | 4.7 ± 0.10 | 5.0 ± 0.5 | 56.0 ± 1 | 2332 ± 84 | 50.0 ± 2 | 746 ± 26 | 117 ± 1 | 1.040 ± 0.002 | 11.0 ± 0.50 |
| 18 | 39.0 ± 1 | 3700 ± 100 | 3.5 ± 0.10 | 3.8 ± 0.3 | 66.0 ± 2 | 2953 ± 90 | 39.0 ± 4 | 562 ± 62 | 126 ± 2 | 1041 ± 0.001 | 8.5 ± 1 |
| 19 | 38.0 ± 1 | 3550 ± 200 | 4.7 ± 0.20 | 5.2 ± 0.5 | 66.0 ± 1 | 3118 ± 77 | 39.0 ± 4 | 554 ± 40 | 121 ± 5 | 1.043 ± 0.002 | 10.0 ± 0.50 |
| 20 | 38.5 ± 0.5 | 3316 ± 45 | 4.0 ± 0.50 | 5.3 ± 0.5 | 66.0 ± 0.5 | 2923 ± 20 | 36.0 ± 3 | 518 ± 50 | 129 ± 1 | 1.030 ± 0.002 | 8.0 ± 0.50 |
| High moduli properties (20 and 22) and respective durability tests (21 and 23) | | | | | | | | | | | |
| 21 | 32.0 ± 0.2 | 2977 ± 85 | 3.0 ± 0.17 | 3.6 ± 0.5 | 59.0 ± 1 | 2584 ± 25 | 28.0 ± 4 | 314 ± 15 | 130 ± 1 | 1.031 ± 0.001 | 17.0 ± 1.00 |
| 22 | 35.0 ± 1 | 3640 ± 50 | 2.3 ± 0.10 | 3.0 ± 0.2 | 59.0 ± 1 | 2410 ± 40 | 27.9 ± 2 | 300 ± 20 | 137 ± 4 | 1.030 ± 0.001 | 17.0 ± 1.00 |
| 23 | 34.2 ± 0.1 | 3334 ± 34.8 | 3.4 ± 0.03 | 3.8 ± 0.1 | 67.7 ± 0.5 | 3266 ± 40 | 25.0 ± 1 | 347 ± 20 | 133 | 1.028 ± 0.002 | 18.0 ± 1.00 |
| 24 | 39.0 ± 0.07 | 3810 ± 145 | 3.0 ± 0.08 | 3.1 ± 0.47 | 67.0 ± 1 | 3200 ± 34 | 35.0 ± 1.5 | 345 ± 30 | 135 | 1.028 ± 0.002 | 17.0 ± 1.00 |
| High moduli properties | | | | | | | | | | | |
| 25 | 35.5 ± 0.2 | 3627 ± 118 | 3.3 ± 0.06 | 3.8 ± 0.26 | 68.0 ± 0.8 | 3214 ± 84 | 28.7 ± 4 | 327 ± 31 | 134 | 1.032 ± 0.002 | 14.0 ± 1.00 |
| 26 | 37.4 ± 0.06 | 3715 ± 162 | 2.9 ± 0.03 | 3.1 ± 0.26 | 70.0 ± 0.3 | 3247 ± 45 | 16.0 ± 0.5 | 327 ± 5 | 138 | 1.030 ± 0.002 | 15.0 ± 1.00 |
| 27 | 37.0 ± 0.1 | 3643 ± 40 | 3.2 ± 0.10 | 3.7 ± 0.15 | 70.8 ± 0.5 | 3343 ± 17 | 27.0 ± 2 | 357 ± 22 | 135 | 1.045 ± 0.003 | 15.0 ± 1 |
| 28 | 38 ± 0.16 | 3060 ± 124 | 3.3 ± 0.04 | 3.8 ± 0.18 | 68.8 ± 1.4 | 3098 ± 20 | 28.4 ± 2.62 | 345 ± 12 | 137 | 1.040 ± 0.002 | 13.0 ± 1 |
| 29 | 38.8 ± 0.16 | 3070 ± 200 | 3.5 ± 0.08 | 4.2 ± 0.37 | 68.8 ± 0.5 | 3089 ± 44 | 28.4 ± 3.594 | 394 ± 14 | 135 | 1.043 ± 0.002 | 13.0 ± 1.00 |
| 30 | 40 ± 1 | 3730 ± 398 | 3.0 ± 0.2 | 3.5 ± 0.4 | 67 ± 2 | 2889 ± 195 | 31 ± 4 | 579 ± 35 | 122 | 1.030 ± 0.002 | 11 ± 1 |
| 31 | 25.8 ± 0.10 | 2004 ± 15.7 | 5.95 ± 0.02 | 24.8 ± 5.9 | 35.2 ± 0.27 | 1400 ± 11.6 | 200 ± 6.4 | — | — | 1.005 ± 0.002 | — |
| 32 | 26.0 ± 0.06 | 1976 ± 14.8 | 5.96 ± 0.02 | 14.9 ± 4.9 | 34.4 ± 0.37 | 1357 ± 28.9 | 210 ± 6.1 | — | — | 1.005 ± 0.002 | — |
| 32* | 27.5 ± 0.10 | 2007 ± 20.3 | 6.16 ± 0.01 | 24.9 ± 4.1 | 37.6 ± 0.29 | 1522 ± 22.1 | 152 ± 1.9 | — | — | 1.005 ± 0.002 | — |

TS: Tensile strength,
TM: Tensile modulus,
EY: Tensile elongation at yield,
EB: Tensile elongation at Break,
FS: Maximum flexural stress,
FM: Flexural modulus,
NIZ: Notched Izod impact,
IZ: Un-notched Izod impact,
HDT: Heat deflection temperature,
MFI: Melt flow index,
NM: not measured.
32*: Same formulation as no. 32, but after 100 h accelerated heat aging at 110° C..

REFERENCES

[1] Mohanty A K, Misra M, Drzal L T. Sustainable Bio-Composites from renewable resources: Opportunities and challenges in the green materials world. J Polym Environ 2002; 10:19-26.
[2] Biagiotti J, Puglia D, Kenny J M. A Review on Natural Fibre-Based Composites—Part II. J Nat Fibers 2004; 1:37-68.
[3] Gupta M, Wang K K. Fiber orientation and mechanical properties of short-fiber-reinforced injection-molded composites: Simulated and experimental results. Polym Compos 1993; 14:367-382.
[4] Das O, Sarmah A K, Bhattacharyya D. A novel approach in organic waste utilization through biochar addition in wood/polypropylene composites. Waste Manag 2015; 38:132-40.
[5] Myllytie P, Misra M, Mohanty A K. Carbonized Lignin as Sustainable Filler in Biobased Poly(trimethylene terephthalate) Polymer for Injection Molding Applications. ACS Sustain Chem Eng 2016; 4:102-10.
[6] Wang F, Du H, Liu H, Zhang Y, Zhang X, Zhang J. The synergistic effects of β-nucleating agent and ethylene-octene copolymer on toughening isotactic polypropylene. Polym Test 2015; 45:1-11.

Although the description above contains much specificity, these should not be construed as limiting the scope of the invention but as merely providing illustrations of some of the presently preferred embodiments of this invention. Thus the scope of the invention should be determined by the appended claims and their legal equivalents, rather than by the examples given.

Future applications claiming priority to this application may or may not include the following claims, and may include claims broader, narrower, or entirely different from the following claims.

What is claimed is:

1. A thermoplastic polyolefin composition comprising a polypropylene (PP), an α-olefin copolymer, more than 0.5% and up to 2% by weight of a β nucleating agent, and biocarbon.

2. The thermoplastic polyolefin composition of claim 1, wherein the thermoplastic polyolefin composition further comprises one or more compatibilizing agents.

3. The thermoplastic polyolefin composition of claim 2 further comprising by weight percent:
   (a) 40-70% of the polypropylene,
   (b) 1-40% of the α-olefin copolymer,
   (c) 10-40% of the biocarbon, and
   (d) up to 10% of the one or more compatibilizing agents.

4. The thermoplastic polyolefin composition of claim 2, wherein the thermoplastic polyolefin comprises by weigh percent:
   (a) about 38-68% wt. of the polypropylene,
   (b) about 1-40% wt. of the α-olefin copolymer,
   (c), up to about 20% wt. of the biocarbon, and
   (d) up to about 10% wt. of the one or more compatibilizing agents.

5. The thermoplastic polyolefin composition of claim 1, wherein the α-olefin copolymer has a melt index of about 13 g/10 min (190° C., 2.16 kg, by ASTM D-1238).

6. The thermoplastic polyolefin composition of claim 1, wherein the thermoplastic polyolefin composition further comprises one or more of carbon fibers, glass fibers, peroxide, a light stabilizer and/or an anti-oxidant.

7. The thermoplastic polyolefin composition of claim 2, wherein the thermoplastic polyolefin comprises:
   (a) about 50-55% wt. of the polypropylene,
   (b) about 4% wt. of the α-olefin copolymer,
   (c) about 30-35% of the biocarbon,
   (d) about 6% of the one or more compatibilizing agents, and
   (e) about 0.16 to 0.5 phr of a solution containing peroxide.

8. The thermoplastic polyolefin composition of claim 7 further comprising up to 0.2 phr of a light stabilizer and up to 0.1 phr of an antioxidant.

9. The thermoplastic polyolefin composition of claim 1, wherein the biocarbon is milled biocarbon.

10. The thermoplastic polyolefin composition of claim 1, wherein the polyolefin composition is devoid of a diene copolymer.

11. The thermoplastic polyolefin composition of claim 1, wherein the PP is homo-PP.

12. A thermoplastic polyolefin composition having a melt flow index (MFI) larger than 15 g/10 minutes, the thermoplastic polyolefin composition comprising by weight percent:
   (a) 40-70% homo-polypropylene,
   (b) 1-40% α-olefin copolymer,
   (c) 10-40% biocarbon,
   (d) up to 10% of one or more compatibilizing agents,
   (e) about 0.16-0.5 phr of a solution containing peroxide; and
   (f) more than 0.5% and up to 2% by weight of a β nucleating agent.

13. The thermoplastic composition of claim 12, wherein the composition further comprises up to 0.2 phr of a light stabilizer and up to 0.1 phr of an antioxidant.

14. A thermoplastic polyolefin composition having an impact greater than 500 J/m and an elongation at break higher than 200%, the thermoplastic polyolefin composition comprising by weight percent:
   (a) between 38 and 68% wt. of homo-polypropylene,
   (b) 1 to 40% wt. of α-olefin copolymer,
   (c), up to 20% wt. of biocarbon, and
   (d) up to 10% of one or more compatibilizing agents.

15. The thermoplastic composition of claim 14, wherein the thermoplastic composition further comprises up to 2% wt. of a β nucleating agent.

16. An automotive part comprising the composition of claim 1.

17. A method of manufacturing a thermoplastic polyolefin composition, the method comprising:
   (a) dispersing carbon fiber within biocarbon, and
   (b) mixing the dispersed carbon fiber with a polypropylene (PP), an α-olefin copolymer, a compatibilizer and more than 0.5% and up to 2% by weight of a β nucleating agent.

18. The method of claim 17, wherein the PP is homo-PP.

19. The method of claim 17 wherein the α-olefin copolymer has a melt index of about 13 g/10 min (190° C., 2.16 kg, by ASTM D-1238).

20. An automotive part comprising the composition of claim 12.

21. An automotive part comprising the composition of claim 14.

22. The automotive part of claim 21, wherein the thermoplastic composition further comprises up to 2 wt % of a β nucleating agent.

* * * * *